(12) United States Patent  (10) Patent No.: US 7,113,320 B2
Tanner  (45) Date of Patent: Sep. 26, 2006

(54) GLV BASED FIBER OPTIC TRANSMITTER

(75) Inventor: Allen H. Tanner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 225 days.

(21) Appl. No.: 10/361,056

(22) Filed: Feb. 6, 2003

(65) Prior Publication Data

US 2004/0156088 A1    Aug. 12, 2004

(51) Int. Cl.
*G02B 26/00* (2006.01)
(52) U.S. Cl. ........................ 359/290; 359/572
(58) Field of Classification Search ........... 359/290, 359/291, 224, 230, 231, 572, 573, 563, 566, 359/570, 571
See application file for complete search history.

(56) References Cited

U.S. PATENT DOCUMENTS

| | | | |
|---|---|---|---|
| 4,662,746 A | | 5/1987 | Hornbeck |
| 5,493,439 A | | 2/1996 | Engle |
| 5,661,593 A | | 8/1997 | Engle |
| 5,838,484 A | | 11/1998 | Goossen |
| 5,867,301 A | | 2/1999 | Engle |
| 6,038,057 A | * | 3/2000 | Brazas et al. ............ 359/291 |
| 6,101,036 A | * | 8/2000 | Bloom ................... 359/567 |
| 6,122,413 A | | 9/2000 | Jiang et al. |
| 6,144,481 A | | 11/2000 | Kowarz et al. |
| 6,147,789 A | * | 11/2000 | Gelbart .................. 359/231 |
| 6,219,015 B1 | | 4/2001 | Bloom et al. |
| 6,229,650 B1 | | 5/2001 | Reznichenko et al. |
| 6,282,012 B1 | * | 8/2001 | Kowarz et al. .......... 359/291 |
| 6,297,899 B1 | | 10/2001 | Romanovsky |
| 6,320,688 B1 | | 11/2001 | Westbrook et al. |
| 6,333,803 B1 | | 12/2001 | Kurotori et al. |
| 6,449,071 B1 | | 9/2002 | Farhan et al. |
| 6,507,706 B1 | * | 1/2003 | Brazas et al. ............ 396/106 |
| 6,751,001 B1 | * | 6/2004 | Tanner et al. ............ 359/238 |

* cited by examiner

*Primary Examiner*—Hung Xuan Dang
*Assistant Examiner*—Tuyen Tra
(74) *Attorney, Agent, or Firm*—Thorpe North & Western, LLP

(57) ABSTRACT

A communications transmitter is disclosed that utilizes a grating light valve (GLV) to impose information on an optical signal. The communications transmitter further includes at least one laser light source, a frequency dispersing device, an electrostatic modulator that serves as a GLV, and at least one data input source. The laser light source is configured to produce a light beam having a specific optical bandwidth and the frequency dispersing device is optically coupled to the light source and configured to disperse the light beam to produce a frequency dispersed light. The electrostatic modulator includes an electrostatically responsive reflective ribbon oriented to receive a portion of the frequency dispersed light having a specified bandwidth. The signal input source typically serves as an analog input source and is electronically coupled to each electrostatic modulator and is configured to cause electrostatic deformation of the reflective ribbon to modify the frequency of light received thereon to produce a modulated reflected light beam.

16 Claims, 2 Drawing Sheets

GLV BASED FIBER OPTIC TRANSMITTER

BACKGROUND OF THE INVENTION

The present invention relates generally to a device for wide band fiber optics communication. More particularly, the present invention relates to using electrostatic modulators in communication applications.

Fiber optic transmitters have a wide variety of applications, especially in the communications industry. Commonly, a fiber optic transmitter includes an amplifier for sending a signal over a long distance. Such a transmitter frequently includes a laser source of a given wavelength, an optical isolator, a modulator to modulate the laser output, and an amplifier.

Modulation of the laser output may be accomplished using a variety of techniques. Transmitters sometimes utilize a direct drive approach to modulate the light source, such as rapidly varying the intensity of the light source. In order to increase the amount of information that may be transmitted, arrays of direct drive diodes have been directly modulated to produce a wideband signal.

Other methods include modulating an existing carrier signal to impress a data stream on the carrier signal. These methods typically use traditional electrooptic, fiber, or digital modulators. Such methods may separate the frequencies of a wideband signal to modulate individual frequencies with different information followed by recombining the modulated frequencies.

Another method for modulating an optical signal is to use a grating light valve (GLV), which offers the ability to perform multi-element modulation. The GLV is an addressable diffraction grating, formed of moving parts on the surface of a silicon chip. Each GLV assembly can have between about 1,000 and 8,000 picture elements where each picture pixel element has six ribbons of silicon. The GLV relies upon the linear nature of the electric and magnetic fields of light or image construction using constructive and destructive interference. This application is typically found within the video arts where the GLV serves as a projector.

A GLV modulator operates on the principles of an attractive electrostatic force being produced by a voltage difference between a conductive substrate and a conducting layer atop a ribbon layer. The attractive force changes the heights of the ribbons relative to the substrate. By modulating the voltage waveform, it is possible to modulate the diffracted optical beam as needed.

Fiber optic modulators are electronically controlled devices that modulate light intensity and are designed to be compatible with optical fibers. However, there is a need for low power, high efficiency, and low loss, inexpensive fiber optic modulators that can be integrated with silicon sensors and electronics and be further optimized for communications with fast transmission speeds.

SUMMARY OF THE INVENTION

According to the present invention, a communications transmitter is disclosed that utilizes a grating light valve (GLV) to impose information on an optical signal. The communications transmitter further includes at least one laser light source, a frequency dispersing device, an electrostatic modulator that serves as a GLV, and at least one data input source. The laser light source is configured to produce a light beam having a specific optical bandwidth and the frequency dispersing device is optically coupled to the light source and configured to disperse the light beam to produce a frequency dispersed light. The electrostatic modulator includes an electrostatically responsive reflective ribbon oriented to receive a portion of the frequency dispersed light having a specified bandwidth. The signal input source is typically a digital signal which is converted to an analog voltage and is electronically coupled to each electrostatic modulator to cause electrostatic deformation of the reflective ribbon to modify the frequency of light received thereon to produce a modulated reflected light beam.

It has been recognized that it would be advantageous to develop a communications transmitter using inexpensive modulators and having a wide bandwidth.

The present invention provides a communications transmitter which includes a laser light source containing multiple frequencies, a frequency dispersing device, an array of modified grating light valves (GLVs), and an analog input source containing information to be superimposed on the frequency dispersed light using the GLV array.

In accordance with a more detailed aspect of the present invention, the system includes a broadband laser light source at a wavelength of between about 1000 nm and about 3000 nm and has a frequency range of 10 to 100 GHz.

In accordance with another more detailed aspect of the present invention, the system may include 2 to 10,000 GLV devices, each receiving frequencies over a 10 MHz range. Of course, one skilled in the art could vary the number of GLV devices to accommodate almost any desired bandwidth. Thus, using more than or fewer than 10,000 GLV devices in an array such as that described herein is within the scope of this disclosure.

Additional features and advantages of the invention will be apparent from the detailed description which follows, taken in conjunction with the accompanying drawings, which together illustrate, by way of example, features of the invention.

DETAILED DESCRIPTION

Figure 1:
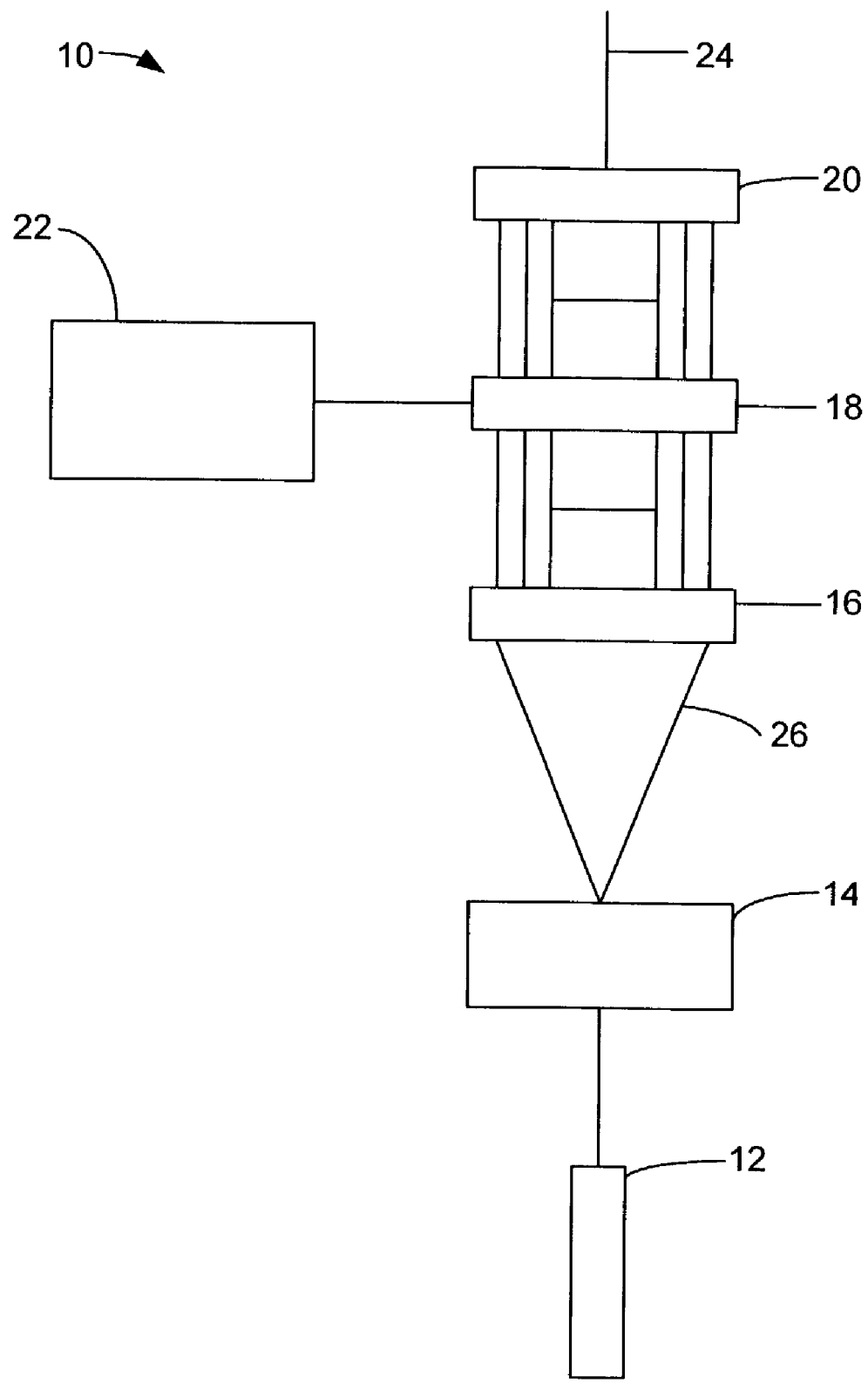
FIG. 1 is a schematic illustration of one embodiment of a fiber optic transmitter in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

In describing and claiming the present invention, the following terminology will be used.

The singular forms "a," "an," and "the" include plural referents unless the context clearly dictates otherwise. Thus, for example, reference to "a modulator" includes reference to one or more of such valves.

As used herein, "frequency dispersing device" refers to any device capable of separating ranges of frequencies or particular frequencies that can then be individually modified. Such devices include, but are not limited to, diffraction grating devices, prisms, multiplexers, demultiplexers, parallel splitters, switches, couplers, and any other device which could separate signals or frequencies.

As used herein, "fiber optic," "doped fiber" and "optical fiber" are used interchangeably and refer to a fiber that has been selectively doped with an optically active element that thus acts as a waveform guide for inputted laser light.

As used herein, "grating light valve" and "electrostatic modulator" are used interchangeably and refer to a device which uses mechanically induced electrostatically controlled ribbon movement to introduce shifts in frequency of incident laser light.

As illustrated in FIG. 1, a communications transmitter 10, in accordance with the present invention, is shown that superimposes information onto incoming laser light using a grating light valve (GLV) modulator. The transmitter 10 includes a light source such as laser 12, a light-grating device 14, a collimating lens 16, a GLV array modulator 18, fiber coupling optics 20, and a signal or information transmitting device 22.

In one embodiment, laser 12 can be a broadband infrared fiber laser that uses low power, approximately 100 milliwatts and operates at a wavelength of 1310 nm and has a frequency range of 10 to 100 GHz. Other types of light sources may be substituted as long as a uniform, coherent beam is produced that can then be modulated with data information for transmission to other destinations. Thus laser 12 has an adjustable optical bandwidth to match a desired data bandwidth.

Communications transmitter 10 serves as a wideband fiber optics communications apparatus. The dual communication information is supplied to the device through the information transmitting device 22. The transmitting device 22 encodes the information onto the light source and transmits it down an optical fiber 24. Within one embodiment, the digital communications bandwidth operates within 10 to 100 GHz with the GLV modulator 18 providing this capability. Non-limiting examples of information which may be transmitted in accordance with the method of the present invention include telephone signals, video, computer data, aircraft controls, and the like.

Control of the bandwidth of the laser is significant. The optical communication fiber 24 is matched to support the wide bandwidths to be transmitted within the apparatus. Further, in one embodiment, more than one GLV modulator having its own fiber optic transmitter can be utilized on the same optical fiber 24. The use of multiple transmitters on single fibers increases the ability of the fiber to deliver information. Maintaining tight bandwidth control allows the transmitters to be spaced, in optical frequency space, close together for maximum utilization.

Laser 12 transmits its light through the optical grating device 14. Grating device 14 serves as a frequency dispersion means and spreads the light in a controlled band of optical frequencies. The spreading of the frequency is also necessary in order for the light source to cover the active surface of each GLV modulator 18. Grating device 14 is typically selected to have a finely ruled diffraction grating and the resulting fanned out light beam is illustrated as dispersed beam 26.

After the light source has undergone frequency dispersion, collimating lens 16 collimates dispersed beam 26 so that it can align with the GLV modulator 18. Accordingly, a collimating lens 16 is utilized to collimate dispersed light beam 26 before it reaches GLV modulator 18. Its main purpose is to focus the light on the surface of the GLV array found within the GLV modulator 18.

GLV modulator 18 typically comprises a silicon microelectronic moving silicon (MEMS) device that consists of a collection of 1,024 ribbons arranged in a column. The 1,024 ribbons correspond to the 1,024 analog voltages provided by the transmission device 22. Ideally, the number of analog voltages should match the number of ribbons arranged within the GLV modulator 18. The number of analog voltages should, however, not exceed the number of ribbons within GLV modulator 18. In one example, the number of ribbons can exceed 6,000 ribbons and be as high as 10,000 ribbons. Ideally, there is no limit to the number of ribbons that may be implemented within a particular GLV modulator 18. Pragmatically, the number of ribbons is limited to the size, shape, and number of channels to be communicated within the transmitter 10.

Each ribbon within GLV modulator 18 generally moves independently of one another and specifically in response to one of the analog voltages provided by transmission device 22. Each ribbon is constructed with a top surface coating of aluminum that reflects the laser light. The motion of the ribbon introduces slight frequency shifts in a Doppler effect into the laser light that lands on it. The ribbons are moved to convert electrical information from the transmitting electronics into optical frequency information.

The array of individual GLV ribbons contains between 5,000 to 7,000 ribbons and may be as high as 10,000 ribbons. Each ribbon has a range of about 10 MHz, which is useful for communications applications. Typical communications applications will require greater than about 1,000 ribbons, however the method of the present invention may be applied to as few as two sets of ribbons.

Once the electrical information is converted into the optical frequency information, the optical signal is then handled by a fiber coupling optics device 20, which then focuses the dispersed, collimated and reflected light beam from GLV modulator into a single beam of light for coupling with a communications optic fiber 24. The communications optic fiber 24 then transmits the light from the transmitter 10 to its intended destinations.

The use of analog signals has the advantage of utilizing the performance advantages of the GLV over other systems while minimizing wasted performance as typically found in other digital approaches. The use of the analog modulation scheme allows for high frequency modulation in the range of 10 MHz per each GLV ribbon. Thus, the GLV modulator 18 can superimpose information in the form of frequency shifts from a base input waveform. The modulated signals may then be recombined using any number of methods such as coupling or multiplexing and then transmitted to a final destination.

Figure 2:
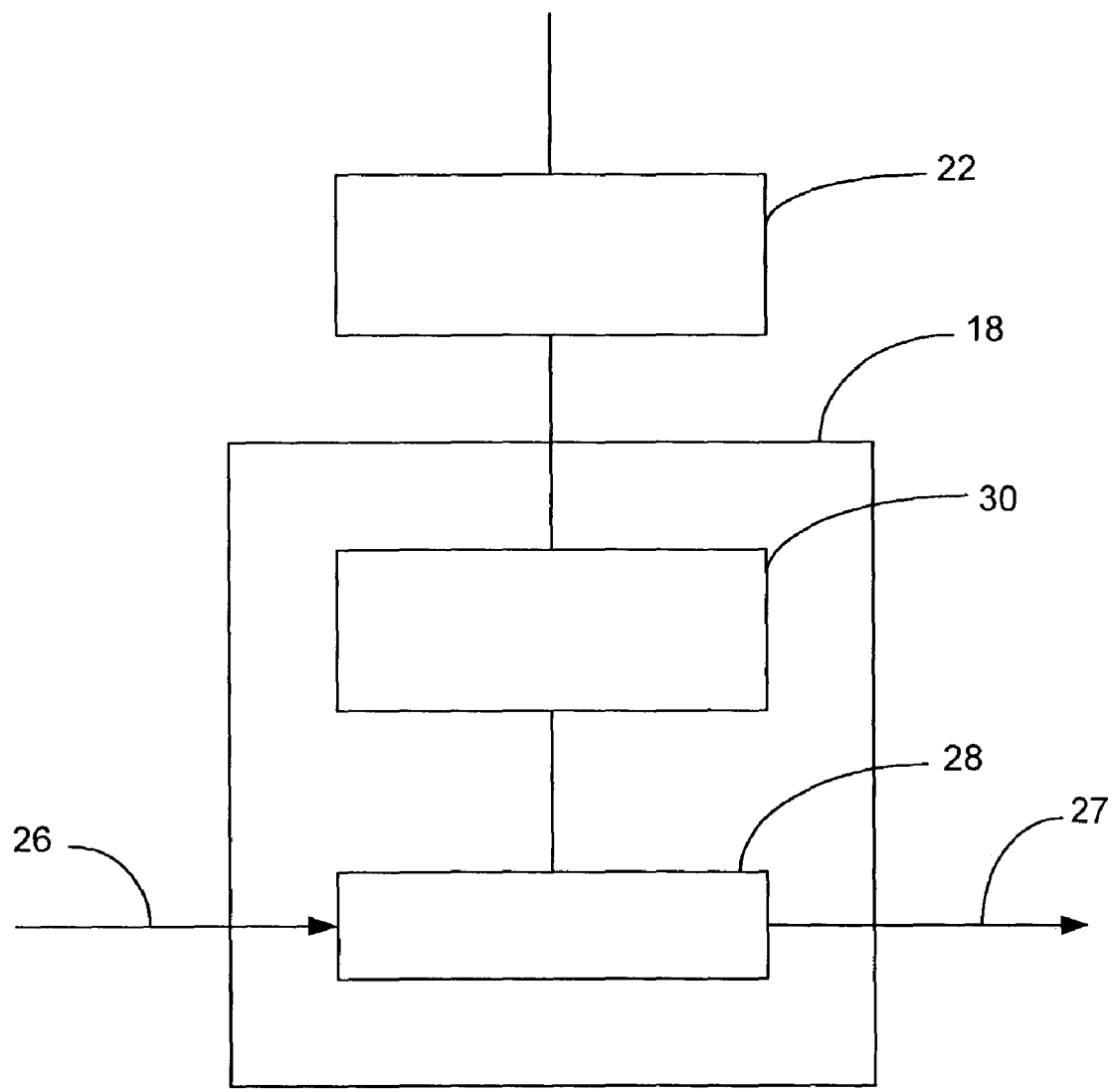
FIG. 2 is a schematic illustration of one embodiment of an electrostatic modulator in accordance with the present invention.

FIG. 2 illustrates a single ribbon 28 normally found within the GLV modulator 18. Ribbon 28 is coupled to a transistor 30, which is further coupled to the transmission device 22. Transmission device 22 includes a digital to analog converter so that a digital signal can be converted into an analog voltage as previously described. A portion of the dispersed light beam 26 that passes through collimating lens 16 impinges upon ribbon 28. The collimated light beam 26 has a frequency range of about 10 to about 100 GHz. The transmission device 22 provides a signal to transistor 30, which is switched to pass the signal to ribbon 28. Ribbon 28 is modified using electrostatic forces by analog voltage. The movement of ribbon 28 imparts a Doppler shift to the incoming light source 26, which then continues on as outgoing light source 27. Should the original signal be analog, the digital to analog converter can be bypassed. As each ribbon operates independently, it may be assigned a unique frequency and transmit unique information.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A grating light valve (GLV) for use in communications comprising:
   a) at least one electrostatically responsive reflective ribbon oriented to receive and reflect an incident light beam having a specified bandwidth; and
   b) a signal transmission device, coupled to the at least one reflective ribbon, to provide at least one analog voltage to the at least one reflective ribbon to generate mechanical movement of the reflective ribbon to impose information to the reflected incident light beam by modulating the frequency of the incident light beam to produce a modulated reflected light beam.

2. The GLV of claim 1 further comprising a switch to electronically couple the ribbon and the analog voltage.

3. The GLV of claim 1, wherein the signal transmission device receives a digital data stream and converts the digital data stream to the at least one analog voltage.

4. The GLV of claim 1, wherein the mechanical movement of the reflective ribbon imparts a Doppler effect frequency modulation of the incident light.

5. A communications transmitter comprising:
   a) at least one laser light source that produces a light beam having a specified optical bandwidth;
   b) a frequency dispersing device, which is optically coupled to the light source, to disperse the light beam; and
   c) at least one grating light valve modulator comprising an electrostatically responsive reflective ribbon oriented to receive and reflect a portion of the dispersed light beam within a specified bandwidth; and
   d) an analog input signal electrically coupled to the at least one grating light valve modulator, the analog input signal being utilized to cause mechanical deformation of the reflective ribbon to frequency modulate the reflected portion of the dispersed light beam to produce a modulated reflected light beam.

6. The transmitter of claim 5, further comprising between 2 and 10,000 grating light valve modulators each independently modulated using an analog signal.

7. The transmitter of claim 5, wherein the laser light source is a broadband light source at a wavelength of 1310 nm and optical bandwidth of 10 to 100 GHz.

8. The transmitter of claim 5, wherein said frequency dispersing device is a diffraction grating device.

9. The transmitter of claim 5, further comprising a collimating lens placed after the frequency dispersing device and before the grating light valve modulator, the collimating lens being utilized to collimate the dispersed light beam into a series of bandwidths.

10. The transmitter of claim 5, where the grating light valve modulator further comprises a transistor coupled to the ribbon.

11. The transmitter of claim 5, further comprising coupling optics optically connected to the modulated reflected light beam to direct the modulated reflected light beam to a fiber optic cable for transmission.

12. The transmitter of claim 5, wherein the signal transmission device includes a digital-to-analog converter, to convert a digital input signal to the analog input signal.

13. A method of transmitting information comprising the steps of:
   a) providing a laser light source to emit a laser light having a specified optical bandwidth;
   b) dispersing the laser light emitted from said laser light source to create a dispersed laser light;
   c) directing the dispersed laser light to at least one grating light valve modulator having an electrostatically responsive ribbon; and
   d) electrostatically deforming the electrostatically responsive ribbon within the at least one grating light valve modulator using an analog voltage source to impose information on a portion of the dispersed laser light to produce a frequency modulated signal within the given bandwidth of frequencies.

14. The method of claim 13 further comprising simultaneously performing steps c) and d) to produce additional modulated signals.

15. The method according to claim 14 further comprising the steps of:
   e) combining all the modulated signals; and
   f) transmitting the combined signals to at least one destination.

16. The method according to claim 13 comprising after the dispersing step, collimating the dispersed light beam prior to reaching the at least one grating light valve modulator.

* * * * *